(12) United States Patent
Maurin

(10) Patent No.: US 6,428,622 B1
(45) Date of Patent: Aug. 6, 2002

(54) APPARATUS FOR COATING A FIBER

(75) Inventor: Laurent Maurin, Loison-sous-Lens (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/534,536

(22) Filed: Mar. 27, 2000

(30) Foreign Application Priority Data

Apr. 1, 1999 (FR) .............................................. 99 04075

(51) Int. Cl.$^7$ ................................................ B05C 3/12
(52) U.S. Cl. ...................................... 118/420; 118/125
(58) Field of Search .............................. 425/113, 197, 425/198, 199; 65/529, 432; 118/125, 420, 410, 411

(56) References Cited

U.S. PATENT DOCUMENTS 1,595,470 A * 8/1926 Johnson
4,531,959 A   7/1985 Kar et al.
5,885,652 A   3/1999 Abbott, III et al.

FOREIGN PATENT DOCUMENTS

EP   0 841 307 A1   5/1938
EP   0 803 482 A1   10/1997

* cited by examiner

*Primary Examiner*—Brenda A. Lamb
(74) *Attorney, Agent, or Firm*—Sughrue Mion, PLLC

(57) ABSTRACT

The fiber-coating apparatus comprises an injector having a tubular grid mounted between two dies between which the fiber travels on the axis of the grid, which grid filled with resin that penetrates therein via holes distributed through its wall. The wall of outside diameter $d_{ext}$ is situated at a minimum distance from the wall of diameter $D_{ext}$ which surrounds it in the injector, such that the ratio $D_{ext}/d_{ext}$ is not less than 1.35 and the difference $D_{ext}-d_{ext}$ is not less than 4 millimeters. The holes through the wall have a minimum diameter of 0.50 mm and a minimum density of 0.20 holes per mm$^2$. The height of the grid lies in the range 5 mm to 50 mm, and the difference between the outside and inside diameters of the cylindrical wall of the grid is not greater than 10 mm, with a minimum inside diameter of 5 mm.

9 Claims, 3 Drawing Sheets

FIG_1
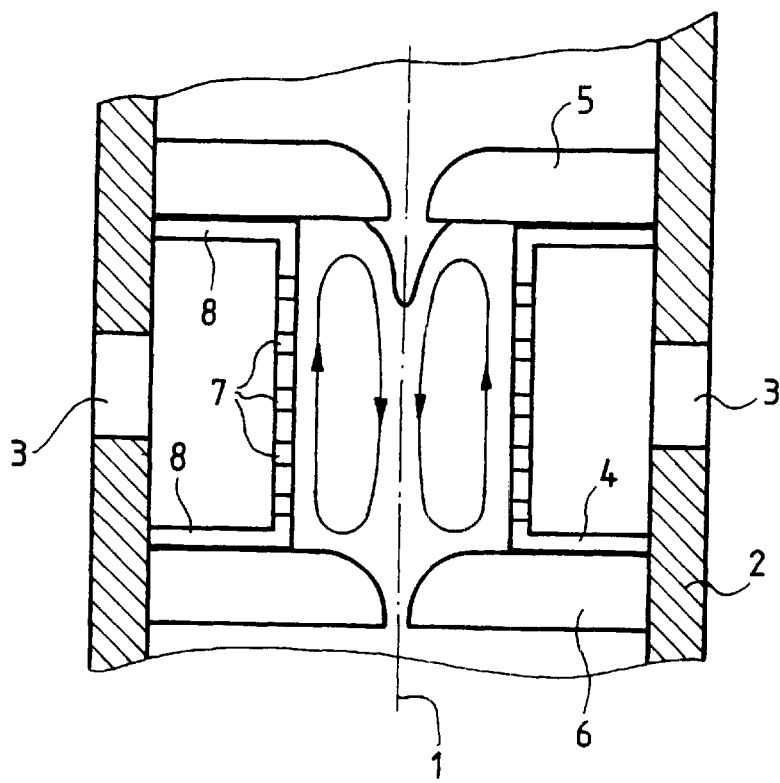
FIG_4
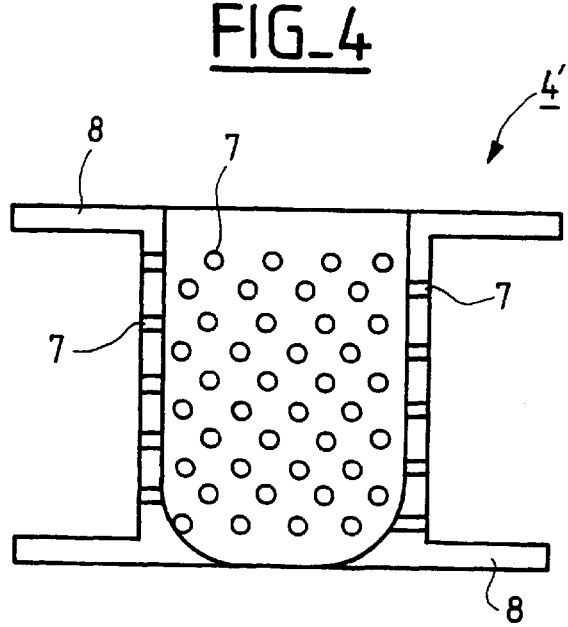

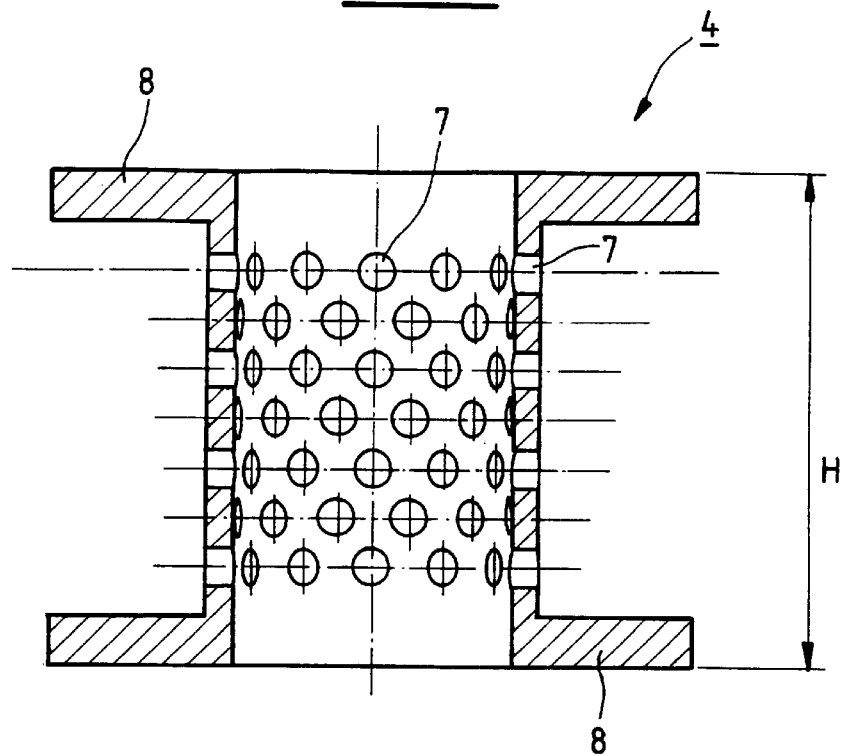
FIG_2
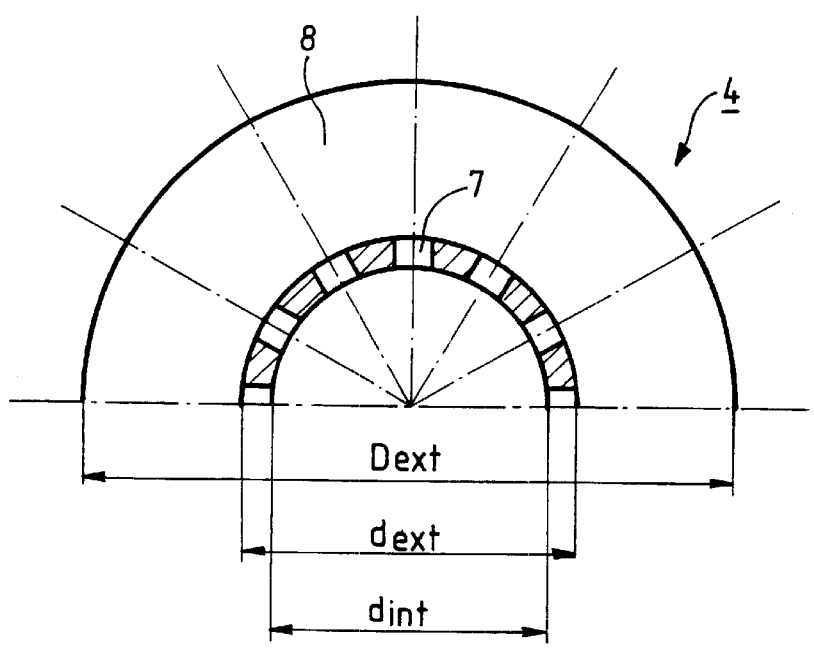
FIG_3

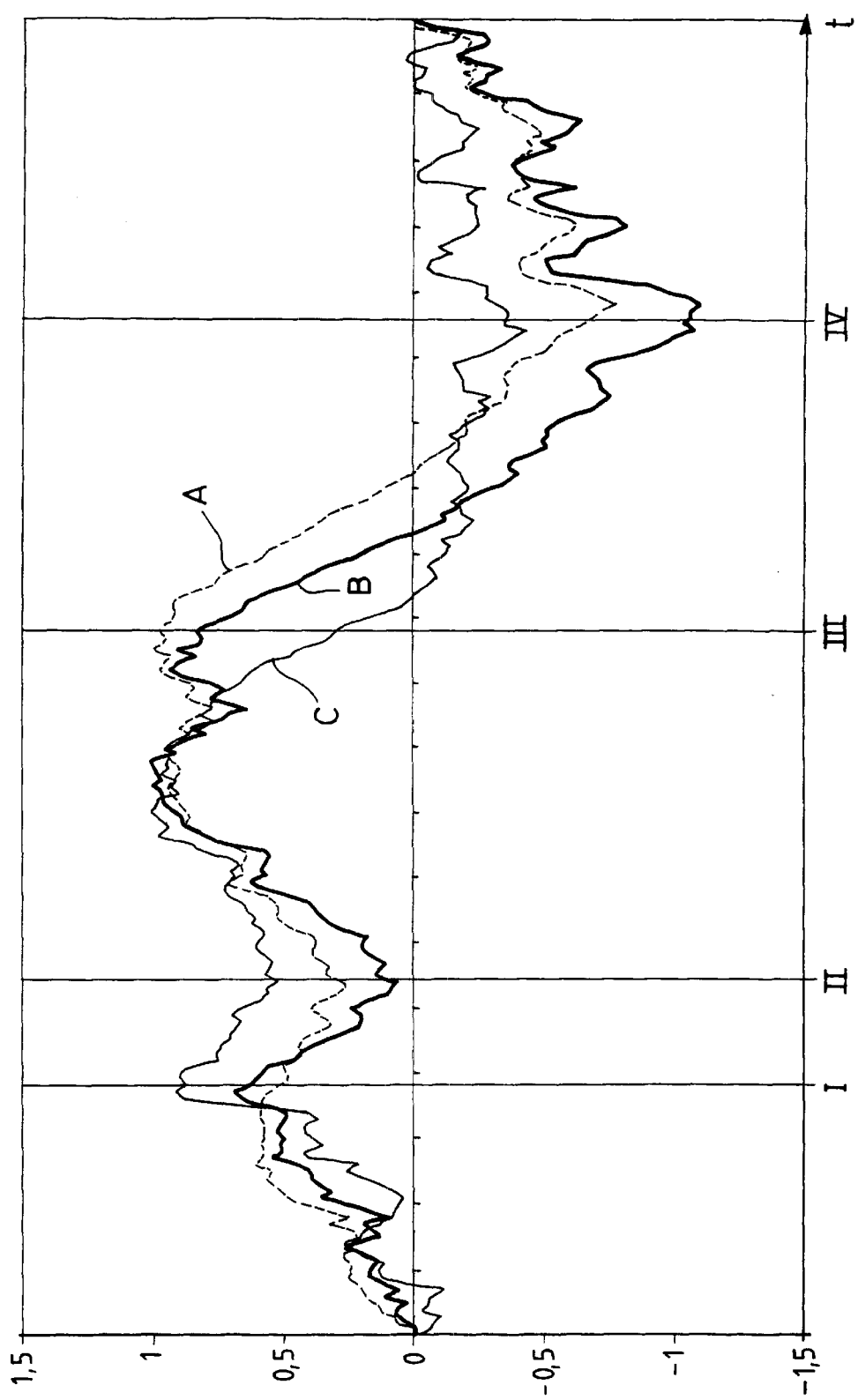
FIG_5

APPARATUS FOR COATING A FIBER

The invention relates to apparatus for coating a fiber, and more particularly for coating a glass optical fiber with resin.

BACKGROUND OF THE INVENTION

Depositing a concentric protective coating on an optical fiber that is produced by high speed drawing, i.e. drawing at a speed in excess of 10 meters per second, requires the use of an injector that enables the coating resin to be distributed uniformly, so as to ensure that defects that could degrade the quality of the fiber, and in particular coating eccentricities, are limited as much as possible.

In conventional manner, an optical fiber is coated after a fiber-drawing operation performed on a preform from which the fiber is drawn. The fiber then passes through two dies that are in vertical alignment and through a resin injector that is placed between the dies. The injector has a grid of tubular appearance with the fiber for coating passing along the axis thereof. The inside of the grid is filled with coating resin which is deposited as a layer on the fiber as it passes through the grid. The inside volume defined by the grid is filled with resin under pressure from the outside and through holes made in the cylindrical wall of the grid. The fiber travelling at high speed through the resin that is present inside the grid of an injector causes the resin to be set into motion that gives rise to a high degree of circulation of the resin inside the grid. This is due to the fact that there exists a speed field of very high gradient within the resin inside the grid when the travel speed of the fiber on the axis of the grid is high, and given that the travel speed of the resin at the cylindrical wall is practically zero, when using grid tubes of the diameters usually provided.

Experience shows that with the grids normally used, the eccentricity of the coating on the fiber increases with increasing travel speed of the fiber. Given that the flow rate of the coating fiber increases with increasing speed of the fiber, one possibility is that the inlet speed and the direction of the resin through the grid of the injector have an influence on eccentricity, with eccentricity tending to increase with increasing inlet speed.

This gives rise to high levels of head loss in the resin as it enters the tube of the grid through the cylindrical wall of the tube. It is therefore advantageous to reduce such head loss to as small a value as possible. There also exist non-uniformities in resin inlet speed distribution through the gird that can lead to phenomena that give rise to eccentricity appearing. In addition, high rates of shear can exist towards the bottom of the volume of resin contained inside the grid, and more precisely at the entrance to the finishing die through which the coated fiber is delivered.

It would also be advantageous to balance the resin flow so as to avoid coating defects of the gap type or of the bead type. It is known that good balance gives rise to a meniscus-like equilibrium surface coming into existence that is maintained by surface tension where the fiber penetrates into the resin contained in the grid. It is therefore important for the coating apparatus, and in particular the injector, to be organized in such a manner as to facilitate maintaining meniscus equilibrium while coating is taking place.

OBJECTS AND SUMMARY OF THE INVENTION

The invention thus proposes fiber coating apparatus comprising an injector provided with a tubular grid that is mounted between two dies between which the fiber travels vertically on the axis of the grid, the grid having a wall of cylindrical appearance and being filled with a coating resin which penetrates therein via distributed holes through its wall.

According to a characteristic of the invention, the apparatus has an injector grid whose cylindrical wall of outside diameter $d_{ext}$ is situated at a minimum distance from the wall of diameter $D_{ext}$ that surrounds it in the injector, said distance being such that the ratio $D_{ext}/d_{ext}$ is not less than 1.35, and the difference $D_{ext}-d_{ext}$ is greater than or at least equal to 4 millimeters. The regularity distributed holes through said walls have a minimum diameter of not less than 0.50 mm and a density per unit area of not less than 0.20 holes per mm$^2$. The height of the grid lies in the range 5 mm to 50 mm, and the difference between the outside and inside diameters of the grid wall $d_{ext}-d_{int}$ is not greater than 10 mm, with a minimum inside diameter $d_{int}$ of 5 mm.

BRIEF DESCRIPTION OF THE DRAWINGS

The invention, its characteristics, and advantages, are described in greater detail in the following description given with reference to the figures mentioned below.

FIG. 1 is a simplified sectional diagram of fiber-coating apparatus.

FIGS. 2 and 3 show an injector of the invention in section on a midplane as seen from in front and from above.

FIG. 4 is a front view in midplane section of a variant embodiment of the injector.

FIG. 5 is a graph showing the cumulative sums of eccentricities obtained over time by alternating a conventional injector and an injector of the invention.

MORE DETAILED DESCRIPTION

The fiber-coating apparatus shown diagrammatically in FIG. 1 is intended to coat a fiber 1, in particular an optical fiber obtained by drawing down from a preform (not shown). This coating is assumed to be performed by means of a resin that is used to make a protective coating that is continuous and uniform lengthwise along the fiber 1, or possibly along some other coating that has already been deposited on the fiber. The resin used is delivered under a determined pressure into an injector 2 via orifices 3 formed in the wall of the injector so as to fill a cavity in which there is received a grid 4 of tubular appearance. The grid 4 is mounted between a guide die 5 and a finishing die 6 between which the fiber 1 taken from the preform is caused to pass. The fiber passes through the grid 4 on its axis, and within the grid it is covered in resin so as to leave the grid in a coated condition via a calibrated orifice for defining the coating that is included in the finishing die 6. The coating resin penetrates into the grid via holes 7 that are distributed over the cylindrical wall of said grid and that pass through said wall, as can be seen in FIGS. 1 to 4. In conventional manner, the purpose of the grid is to distribute the resin around the fiber in uniform manner.

To this end, provision is made for the cylindrical wall of the grid 4 whose outside diameter is $d_{ext}$, to be housed in the cavity of the injector 2 which receives it in such a manner that it is situated at a minimum distance from the wall of diameter $D_{ext}$ that surrounds it in the injector. In the grid embodiments shown in FIGS. 1 to 4, the cylindrical wall of the grid has a flange 8 around each of its ends, which flange has an outside diameter that is selected to be equal to $D_{ext}$ so as to define the minimum volume required around the tube of the grid for resin circulation. Naturally, it is possible to envisage providing a flange 8 at only one of the two ends of a grid.

According to the invention, the ratio $D_{ext}/d_{ext}$ is selected to be not less than 1.35 and the difference $D_{ext}-d_{ext}$ is selected to be greater than or at least equal to 4 millimeters, so as to enable resin flows around the grid to be made uniform prior to said resin penetrating into the inside of the tube via the holes 7, and so as to eliminate the eccentricities that appear in the fiber coating when speed distribution non-uniformities exist in the way resin is fed around the tube.

Provision is also made for the holes through the cylindrical wall of the grid to be distributed uniformly, as can be seen in FIGS. 2 and 3 where the holes are offset horizontally from one another by π/6 and are offset vertically from one row to the next by π/12. The density of these holes is selected to be as great as possible so as to allow the fiber to travel at high speed through the injector, with minimum eccentricity, while conserving a moderate speed for resin penetration into the tube of the grid. The minimum diameter of the holes 7 formed through the tubular wall of the grid should be not less than 0.50 mm, and the minimum density of the holes through the wall should not be less than 0.20 holes/mm².

The height H of the grid tube lies in the range 5 mm to 50 mm, in particular to keep the meniscus that appears at the top surface of the resin inside the grid tube during coating far enough away from the finishing die 6. This is intended in particular to avoid the meniscus becoming temporarily engulfed in the die, thereby giving rise to coating defects. Putting a limit on the height H serves in particular to avoid the potential vibration nodes as constituted by the dies 5 and 6 being spaced apart by a distance that allows the fiber to move away from its axis, sufficiently to give rise to unacceptable eccentricity of the coating if the fiber is caused to move transversely between the dies.

The thickness of the wall of the grid tube is small so as to reduce head losses where the resin penetrates through the holes 7 into the grid tube from the outside of the tube, and so as to facilitate heat exchange within the resin, whether the resin is inside or around the grid tube.

The difference between the outside diameter $d_{ext}$ and the inside diameter $d_{int}$ is designed to be no greater than 10 mm with a minimum inside diameter $d_{int}$ of 5 mm. This minimum diameter serves in particular to keep head losses down to an acceptable value as the resin penetrates into the grid tube. It enables the meniscus to develop naturally without being disturbed. It also makes it possible to limit the shear rate in the resin at the inlet to the finishing die 6 at the bottom of the grid tube.

In a variant embodiment shown in FIG. 4, the grid 4' is made so that the cylindrical wall of the grid tube closes inwardly in the form of a curve around the central opening that it has at its bottom end. This curve is determined in conventional manner so as to reduce the shear rate in the resin surrounding the fiber at the outlet from the injector, at the inlet to the finishing, bottom die 6.

The graph of FIG. 5 was drawn up on the basis of eccentricity measurements made during the production of a series of fiber reels using coating apparatus having mounted therein in alternation a prior art injector during a first period terminating at I, a period situated between II and III, and a period beginning at IV, with an injector of the invention being mounted therein during the periods that are situated between I and II and also between III and IV. The fiber used by way of example was an optical fiber whose core was covered by two superposed layers of coating.

Each of the three curves A, B, and C represents the accumulated sum of eccentricities respectively measured over time concerning the eccentricity of the primary coating relative to the fiber (curve A), the eccentricity of the secondary coating relative to the fiber (curve B), and the eccentricity of the secondary coating relative to the primary coating (curve C).

The graph shows clearly that apart from variations in accumulated eccentricity for the various reels of fiber produced using the same injector and for each of the periods, a clear improvement was obtained in terms of eccentricity reduction when using the injector of the invention compared with the prior art injector. The improvements constituted by reducing eccentricity measured in terms of cumulative values are represented in this graph by the negative slopes that can be seen during those periods when an injector of the invention was used. These slopes generally correspond for all three curves and they represent a reduction of defects in the coated fibers. This reduction makes it possible to envisage increasing the speed of fiber drawing and the speed at which the fiber passes through the coating device.

What is claimed is:

1. Fiber-coating apparatus comprising an injector having a tubular grid mounted between two dies between which a fiber travels vertically on an axis of the tubular grid which is filled with coating resin that penetrates therein via holes distributed through a cylindrical wall of the tubular grid, wherein the cylindrical wall of the tubular grid has an outside diameter $d_{ext}$ lying at a minimum distance from a wall of diameter $D_{ext}$ surrounding the cylindrical wall of the tubular grid in the injector, such that a ratio $D_{ext}/d_{ext}$ is not less than 1.35 and a difference $D_{et}-d_{ext}$ is not less than 4 millimeters, with the holes regularly distributed through the cylindrical wall of the tubular grid having a diameter of not less than 0.50 mm and a density of not less than 0.20 holes per mm², a height of the tubular grid lying in the range 5 mm to 50 mm and a difference between an inside and the outside diameters of the cylindrical wall of the tubular grid, $d_{ext}-d_{int}$ being no greater than 10 mm, with the minimum inside diameter $d_{int}$ of 5 mm.

2. Coating apparatus according to claim 1, in which the tubular grid has a volume-defining flange at at least one of two ends of the tubular grid, each flange having an outside diameter $D_{ext-flange}$, such that the ratio $D_{ext-flange}/d_{ext}$ is not less than 1.35 and the difference $D_{ext-flange}-d_{ext}$ is not less than 4 millimeters.

3. Coating apparatus according to claim 1, in which the cylindrical wall of the tubular grid closes inwardly in the form of a curve around a bottom central opening through which the fiber exits to penetrate into a bottom finishing die.

4. Fiber-coating apparatus comprising an injector having a tubular grid mounted between two dies between which a fiber travels vertically on an axis of the tubular grid which is filled with coating resin that penetrates therein via holes distributed through a cylindrical wall of the tubular grid, wherein the cylindrical wall of the tubular grid has an outside diameter $d_{ext}$ lying at a minimum distance from a wall of diameter $D_{ext}$ surrounding the cylindrical wall of the tubular grid in the injector, such that a ratio $D_{ext}/d_{ext}$ is not less than 1.35; and wherein a difference $D_{ext}-d_{ext}$ is not less than 4 millimeters.

5. Coating apparatus according to claim 4, in which the tubular grid has a volume-defining flange at least one two ends of the tubular grid, each flange having an outside diameter $D_{ext-flange}$, such that the ratio $D_{ext-flange}/d_{ext}$ is not less than 1.35 and the difference $D_{ext-flange}-d_{ext}$ is not less than 4 millimeters.

6. Coating apparatus according to claim 4, in which the cylindrical wall of the tubular grid closes inwardly in the form of a curve around a bottom central opening through which the fiber exits to penetrate into a bottom finishing die.

7. The coating apparatus according to claim 4, wherein a difference between the outside diameter $d_{ext}$ and an inside diameter $d_{int}$ of the cylindrical wall of the tubular grid, $d_{ext}-d_{int}$, is no greater than 10 mm.

8. The coating apparatus according to claim 4, wherein a minimum inside diameter of the cylindrical wall of the tubular grid $d_{int}$ is 5 mm.

9. The coating apparatus according to claim 4, wherein a height of the tubular grid is in the range 5 mm to 50 mm.

* * * * *